(12) United States Patent
Burgett et al.

(10) Patent No.: US 6,768,449 B1
(45) Date of Patent: Jul. 27, 2004

(54) DEVICE AND METHOD FOR CALIBRATING AND IMPROVING THE ACCURACY OF BAROMETRIC ALTIMETERS WITH GPS-DERIVED ALTITUDES

(75) Inventors: Scott Burgett, Overland Park, KS (US); Tracy Olivier, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/299,932

(22) Filed: Nov. 19, 2002

Related U.S. Application Data

(62) Division of application No. 09/833,318, filed on Apr. 12, 2001, now Pat. No. 6,522,298.

(51) Int. Cl.$^7$ .................................................. G01S 3/02
(52) U.S. Cl. .................................. 342/357.06; 342/462
(58) Field of Search ........................ 342/357.06, 357.12, 342/462; 701/213, 215

(56) References Cited

U.S. PATENT DOCUMENTS

| | | | |
|---|---|---|---|
| 5,146,231 A | 9/1992 | Ghaem et al. ............... 342/419 |
| 5,210,540 A | * 5/1993 | Masumoto ............. 342/357.11 |
| 5,266,958 A | 11/1993 | Durboraw, III ............. 342/357 |
| 5,572,217 A | 11/1996 | Flawn ......................... 342/357 |
| 5,583,776 A | 12/1996 | Levi et al. ................... 364/450 |
| 5,646,857 A | 7/1997 | McBurney et al. ....... 364/449.7 |
| 5,717,406 A | 2/1998 | Sanderford et al. ......... 342/457 |
| 5,745,054 A | 4/1998 | Wilkens ..................... 340/972 |
| 5,757,316 A | 5/1998 | Buchler ....................... 342/357 |
| 5,820,080 A | 10/1998 | Eschenbach ................ 244/183 |
| 5,917,449 A | 6/1999 | Sanderford et al. ......... 342/457 |
| 5,940,035 A | 8/1999 | Hedrick ...................... 342/462 |
| 5,952,961 A | 9/1999 | Denninger ............. 342/357.08 |
| 5,955,973 A | 9/1999 | Anderson ................... 340/988 |
| 6,055,477 A | 4/2000 | McBurney et al. ......... 701/207 |
| 6,067,046 A | 5/2000 | Nichols .................. 342/357.14 |
| 6,084,547 A | 7/2000 | Sanderford et al. ......... 342/457 |
| 6,157,891 A | 12/2000 | Lin ............................. 701/301 |
| 6,178,363 B1 | 1/2001 | McIntyre et al. ............. 701/16 |
| 6,188,956 B1 | 2/2001 | Walters ...................... 701/200 |
| 6,216,064 B1 | 4/2001 | Johnson et al. ................ 701/4 |
| 6,246,960 B1 | 6/2001 | Lin ............................. 701/214 |
| 6,249,246 B1 | 6/2001 | Bode et al. ............ 342/357.14 |
| 6,256,559 B1 | 7/2001 | Tsui ............................... 701/4 |
| 6,259,380 B1 | 7/2001 | Jensen ........................ 340/970 |
| 6,529,827 B1 | * 3/2003 | Beason et al. .............. 701/213 |

FOREIGN PATENT DOCUMENTS

| | | | |
|---|---|---|---|
| WO | WO 01/71281 | * 9/2001 | ................. 701/213 |

* cited by examiner

Primary Examiner—Dao Phan
(74) Attorney, Agent, or Firm—Devon A. Rolf

(57) ABSTRACT

A portable, handheld electronic navigation device includes an altimeter and a GPS unit. An internal memory stores cartographic data, for displaying the cartographic data on a display of the navigation device. Accordingly, the device is capable of displaying cartographic data surrounding a location of the unit as determined by GPS and altitude information as determined by the barometric altimeter and GPS. The device provides an enhancement of the calibration and hence the accuracy of barometric altimeter measurements with the aid of derived altitudes from a GPS. The device is able to determine the need for calibration and perform the subsequent computations necessary to facilitate the calibration. Furthermore, the device is able to determine a correction quantity that should be applied to barometric altitude readings, thereby allowing the device to be calibrated while in motion. Both of these features ultimately result in a more accurate determination of altitude. In accordance with an aspect of the invention, the altimeter of the navigation device may be calibrated with altitude information entered by a user, with altitude information obtained from the cartographic, with altitude information derived from GPS or with any combinations thereof.

6 Claims, 5 Drawing Sheets

DEVICE AND METHOD FOR CALIBRATING AND IMPROVING THE ACCURACY OF BAROMETRIC ALTIMETERS WITH GPS-DERIVED ALTITUDES

This application is a divisional of application Ser. No. 09/833,318, filed Apr. 12, 2001 now U.S. Pat. No. 6,522,298.

BACKGROUND OF THE INVENTION

1. Field of the Invention

The present invention is directed to enhancements for incorporation into an electronic navigation device. More particularly, the present invention is directed to an enhancement of the calibration and hence the accuracy of barometric altimeter measurements with the aid of derived altitudes from a global positioning system.

2. Description of the Related Art

In general, altitude measurements are made using two methods of measurement. One method utilizes a barometric altimeter. Barometric altimeters are devices that sense local atmospheric pressure and use a standard model of the atmosphere to convert this pressure measurement into altitude. Altitude measurements are referenced to height above mean sea level (MSL).

It is well known that local atmospheric pressure at a given altitude varies widely due to the effects of weather, solar heating, and other factors. Thus, in order to provide an accurate altitude, barometric altimeters must be calibrated to correct for these variations. The Global Positioning System (GPS) is a worldwide navigation system that can determine a user's position in horizontal and vertical dimensions. However, GPS vertical measurements are currently all referenced to the WGS-84 ellipsoid, a purely mathematical construct that approximates the shape of the earth. The GPS receiver must use a model that relates the height above the ellipsoid to the height above mean sea level.

Further, it is well known that the vertical measurement of a GPS system is inherently less accurate than the horizontal measurements. This is due to the fact that GPS satellites are constrained to be above the horizon for signal reception to occur. This geometry is less that optimal for measuring the vertical component of a user's location simply because there can not be satellites visible below the user (an optimal configuration would have satellites above and below the user). All GPS receivers are able to take into account satellite geometry (Dilution of Precision) and estimates of other satellite-related errors (URA) and provide a statistical estimate of the errors in the horizontal and vertical measurements.

In practice, a barometric altimeter typically provides a more stable measurement of altitude than GPS over short time periods. However, over long time periods, pressure variations can be of such magnitude that the barometric altimeter measurement of altitude is less accurate than the GPS measurement. The pressure-indicated altitude of an uncalibrated barometric altimeter is typically in error by many tens of meters due to normal atmospheric pressure fluctuations, weather fronts and other sources. However, this error is of a bias like nature—it is slowly varying with time—resulting in less accurate barometric altimeter readings over long time periods. Accordingly, while an altitude determination derived from barometric pressure may be meaningfully accurate in a short time frame, over time, the accuracy of such a determination becomes undesirable. Conversely, because GPS derived altitude suffers from different complementary errors, over a short time period (typically minutes time frame), GPS altitude measurements are subject to much larger variations than barometric altimeter measurements.

In an attempt to overcome the foregoing, one proposal combines a GPS unit and a barometric pressure sensor in the same housing. However, in that proposal the pressure sensor is used to augment GPS derived altitude information.

In particular, McBurney et al., in U.S. Pat. No. 6,055,477, disclose a method of combination or integration of measurements made using two systems to provide better availability or accuracy in altitude measurements by estimating a barometric bias using the difference in altitude obtained from the two sources. The McBurney et al. method however, fails to recognize that utilizing the difference between a GPS derived altitude and a barometric altimeter altitude, as a term in calibrating the barometer altimeter, will common mode out any dynamic changes due to movement of the barometric altimeter and the GPS in tandem. As a result, the McBurney et al. approach undesirably requires that the user not change altitude during calibration periods.

Additionally, in the stated prior approach, an altimeter may only be calibrated using GPS derived altitude information when the user is stationary, often referred to as a "Calibration mode". The present invention makes no distinction between "calibration mode" and "navigation mode", indeed the barometric error is constantly being estimated and used to calibrate the system. Furthermore, the present invention provides a method to statistically determine the need for calibration which results in both the calibration and error estimation numbers being calculated and utilized without any user intervention, i.e. the user need not place the device in 'calibration mode' to obtain the required bias parameter for calibration computations.

There exists a need for a method to take advantage of the long term stability of the GPS altitude measurement and the short term stability of the barometric altimeter measurement to produce an altitude measurement that is stable and accurate over long and short time periods. Additionally, the need exists for a method that uses both GPS-derived altitude and barometric altimeter altitude to produce an altitude measurement that is more stable and accurate than either measurement taken alone. The need also exists for an improved method to calibrate a barometric altimeter and to compute a barometric altitude correction quantity. Particularly, the need exists for a method to have GPS and altimeter outputs to be self calibrating while the user is on the move. The present invention fills the foregoing identified needs, and other needs, while overcoming the drawbacks of the prior art.

SUMMARY OF THE INVENTION

It is an object of the present invention to provide an improved navigation unit.

It is another an object of this invention to compute a barometric altitude correction quantity such that the use of this quantity during calibration results in measurements that are more stable and accurate than GPS or barometric measurements taken independently.

It is another object of the present invention to improve on constraints that are required by prior art methods of various types where there is a user distinction between calibration and navigational modes.

It is a further object of the invention to provide unique options for statistically determining the need for calibration of an altimeter based on discrepancy between GPS altitude measurements and other altitude measurements.

It is another object of the present invention to provide continuous is calibration of an altimeter while the unit is on the move.

These and other objects are achieved by a portable unit having an internal processor. Connected to the processor are, at a minimum, an input (such as a keypad), a display, a memory, a barometric pressure sensor, and a GPS receiver, which also connects to an antenna, such as a GPS patch antenna. These components, along with a power supply (such as batteries) are housed within a housing. As will be understood and appreciated, the input and display are accessible at an exterior of the housing, in a conventional manner.

A navigation device incorporating the present invention serves as a GPS unit, in that GPS signals from a plurality of satellites may be received by the GPS receiver, such that the processor calculates position information based upon the received signals. The conventional use and operation of GPS units is well known, and need not be further described.

Additionally, the present invention addresses an altimeter. In particular, the barometric pressure sensor measures barometric pressure and provides the sensed barometric pressure information to the processor. The processor, utilizing stored software, then converts the measured pressure into an altitude, which may be displayed or otherwise communicated to the user. The conversion of barometric pressure to altitude may be accomplished in any desired and conventional manner. For example, a lookup table may be provided in the memory, where the table contains altitude information corresponding to known barometric pressures. Thus, an altitude corresponding with a sensed barometric pressure may be retrieved from memory and displayed on the display. Alternatively and preferably, altitude (or elevation) may be calculated using a known equation.

In particular, the present invention provides a unique navigation device and method for a navigation device that combines data from a plurality of sensors and position information obtained from a GPS, to provide the user with an accurate representation of altitude information. Additionally, as stated, the simultaneous access to GPS information and altimeter information, as well as calculating the difference between that information to obtain an indication of bias, allows for features such as automatic calibration and calibration while the user is on the move.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
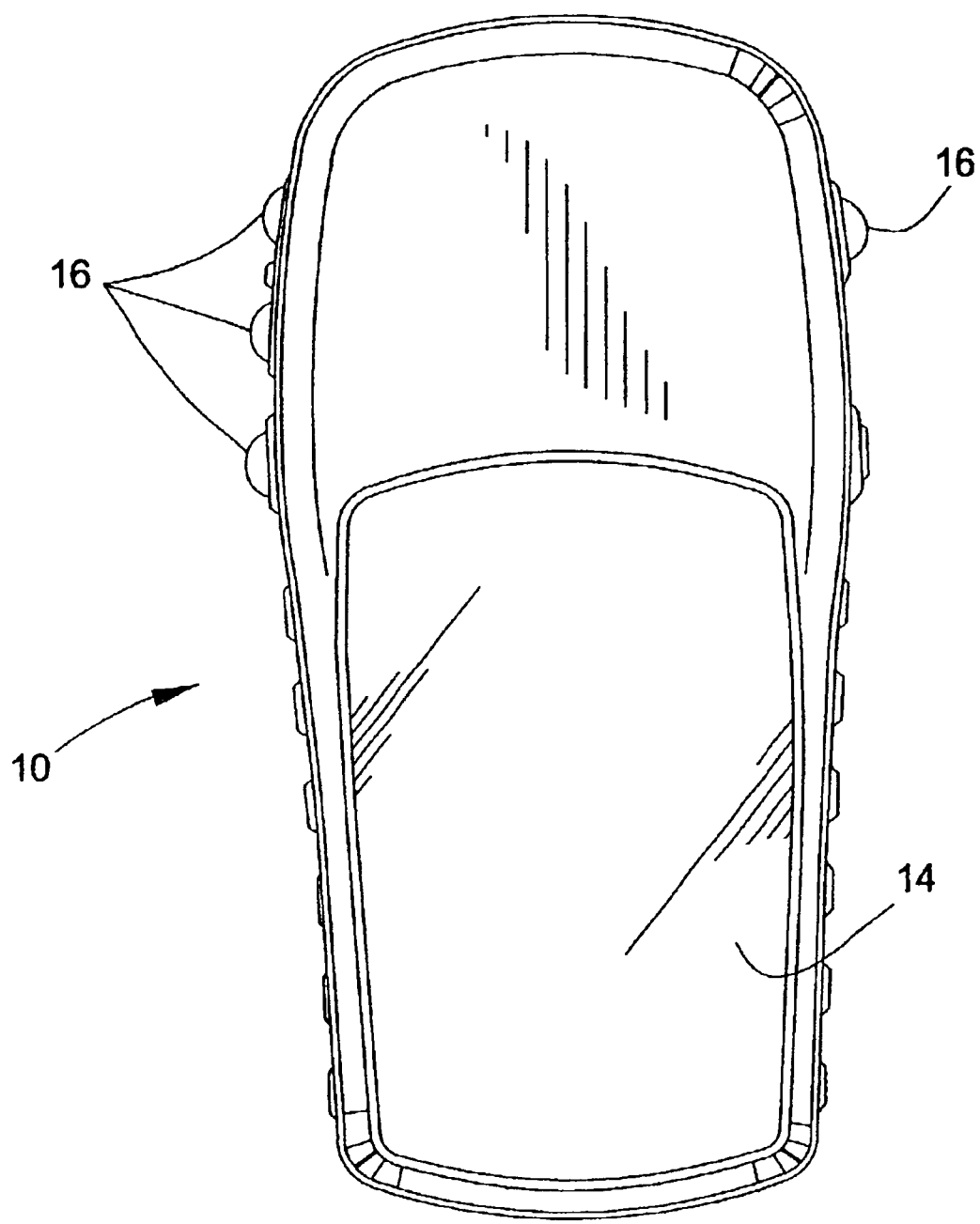
FIG. 1 is a front view of an illustrative embodiment of a navigation of the present invention.

With reference initially to FIG. 1, a navigation device that incorporates the present invention is denoted generally by reference numeral 10. Navigation device 10 has a housing 12, a display 14, and an input 16, preferably a keypad input. Other known inputs, such as a touch screen, may be utilized additionally or alternatively. The housing 12 is preferably sized to be portable, although the invention is not limited to portable units.

Figure 2:
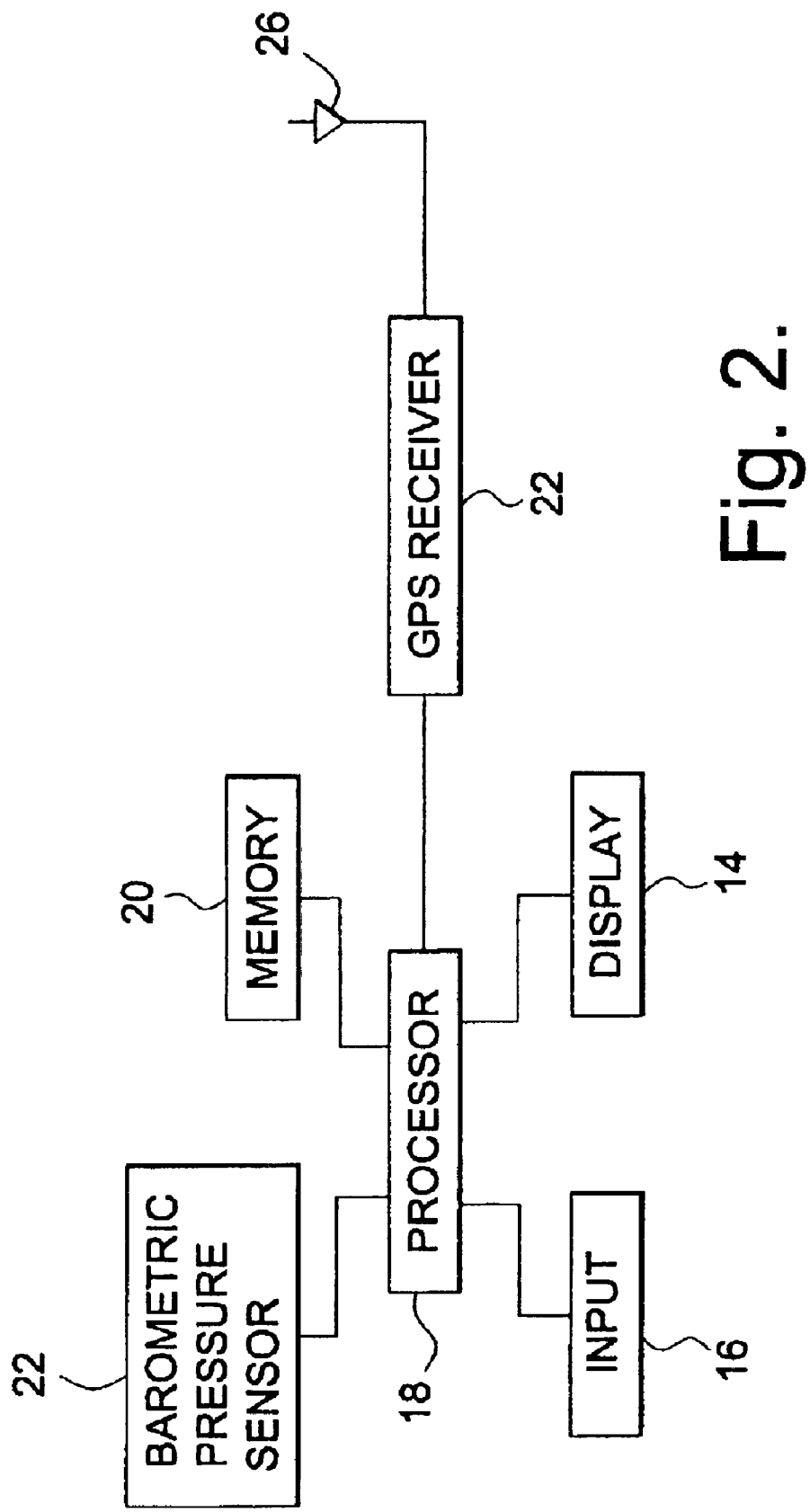
FIG. 2 is an illustrative block diagram of a navigation device that incorporates the present invention.

With reference to FIG. 2, navigation device 10 has a processor 18. Connected to processor 18 are a memory 20, the display 14, the input 16 and a barometric pressure sensor 22. Additionally, a GPS receiver 24 is connected to the processor 18. An antenna 26, for receiving GPS signals, is connected to the GPS receiver 24. A power source, such as batteries, or a battery pack (not shown), is utilized to supply power to the various electronic components. Additionally, navigation device 10 may include a port, such as serial data port, for connecting the device 10 to a remote processor or personal computer for uploading information (such as map information) to the device 10, or for downloading information (such as route information) to a remote processor or personal computer. Alternatively, the device 10 may include wireless communication capabilities, such that data is received wirelessly from a remote site. As will be understood and appreciated, the various electronic components are housed within the housing 12, such that display 14 and keypad input 16 are accessible at an exterior of the housing.

Figure 3:
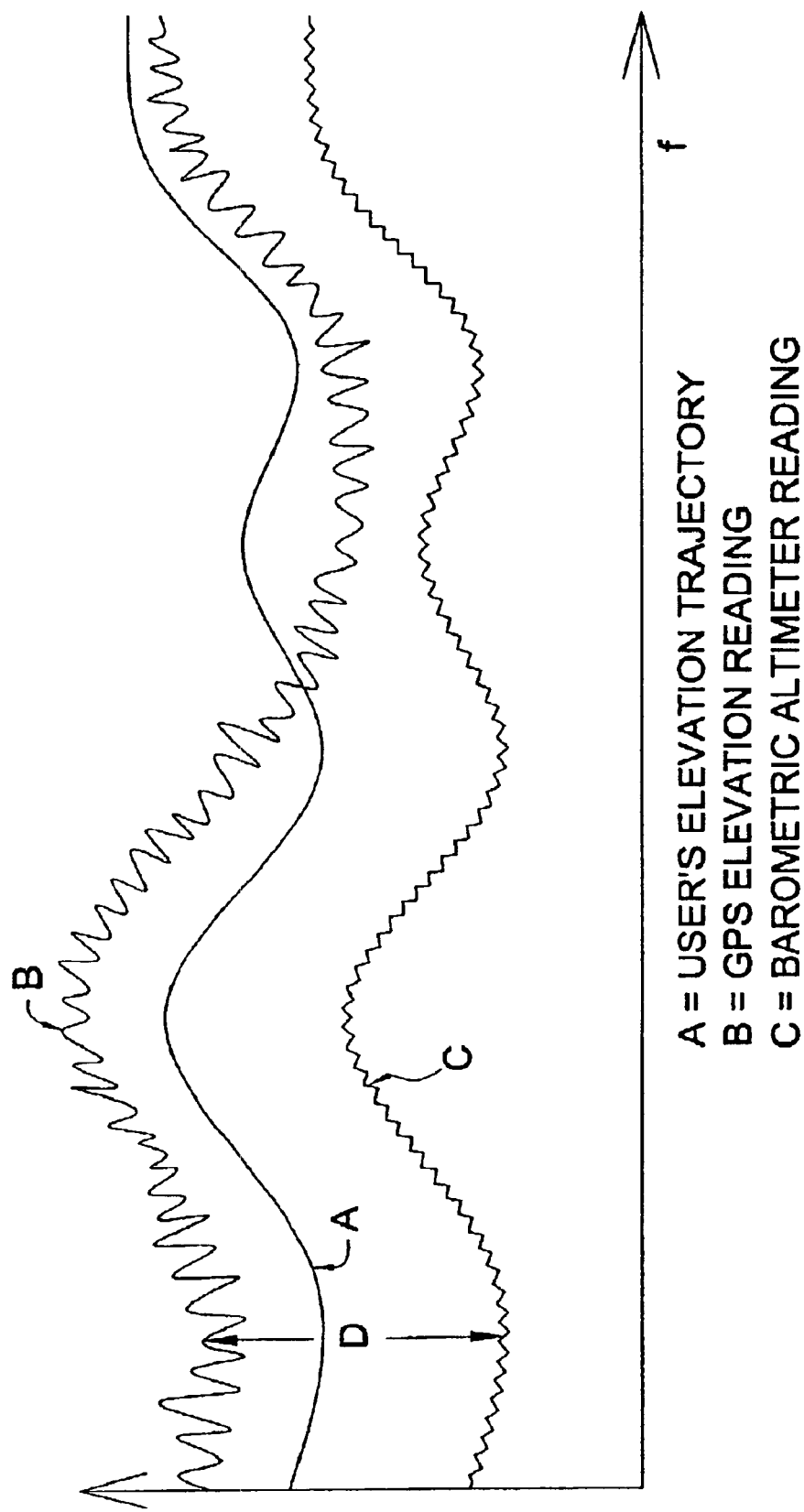
FIG. 3 is a graphical representation of a user's elevation trajectory and GPS based and barometric altimeter based elevation readings.

With reference to FIG. 3, a graphical representation representing a user's elevation trajectory (A), a GPS elevation reading (B), and a barometric altimeter reading (C) is illustrated. In particular, an exemplary elevation profile of a user using navigation device 10 is represented by line A in FIG. 3. In other words, line A represents the trajectory of a user using navigation device 10 as, for example, he or she travels over terrain. The GPS elevation reading is depicted by signal B. As illustrated, the GPS elevation reading B varies over time, as the user moves along the path of use. Similarly, the barometric altimeter reading varies over time from the actual elevation trajectory of the user, although far less significantly, typically, than the GPS elevation reading. Additionally, as illustrated, the barometric altimeter reading is typically offset by a bias amount, or difference D, from the GPS elevation reading.

Figure 4:
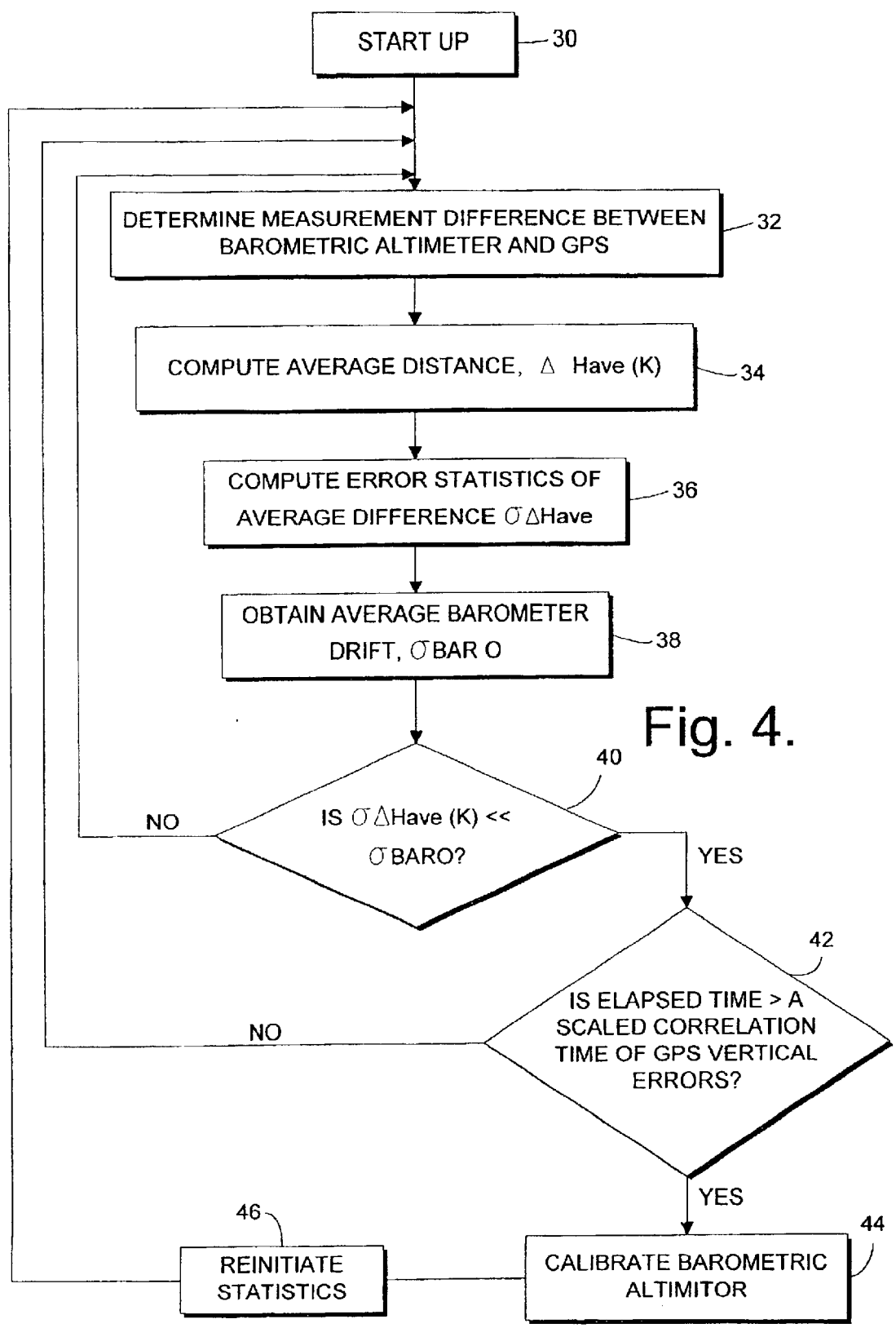
FIG. 4 is a block diagram illustrating barometric altimeter calibration processing according to the present invention.
Figure 5:
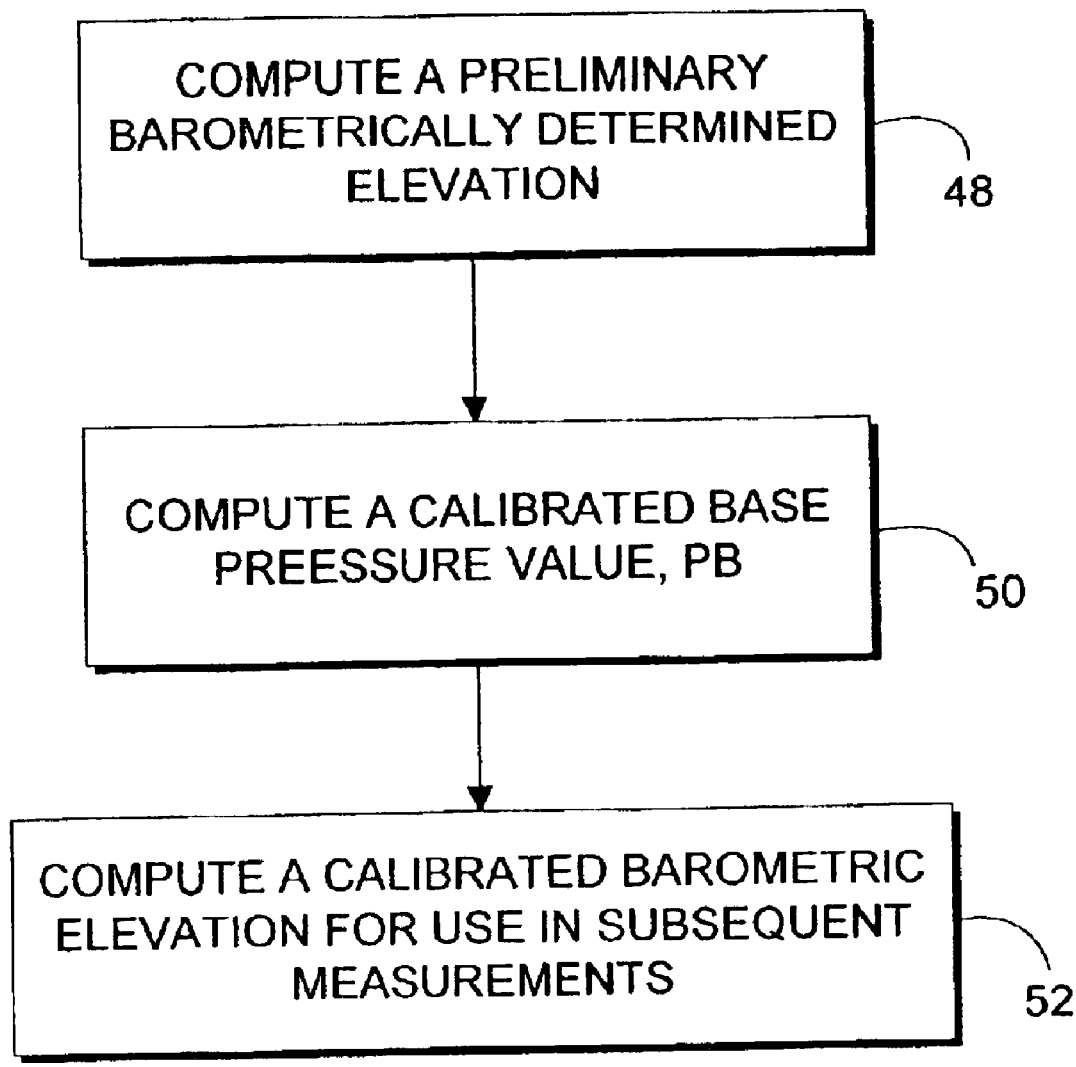
FIG. 5 is a block diagram illustrating barometric altimeter calibration processing according to the present invention.

With reference now to FIGS. 4 and 5, a method of calibrating the altimeter of device 10 is illustrated and described. In accordance with an aspect of the invention, when the processor determines that the difference between the altitude based upon a barometric pressure reading from sensor 30 and GPS derived altitude differs by a selected threshold amount, the processor begins computations necessary to calibrate the barometric readings. In practice, a barometric altimeter typically provides a more stable measurement of altitude than GPS over short time periods (from tens of minutes to several hours). However, over long time periods, pressure variations can be of such magnitude that the barometric altimeter measurement of altitude is less accurate that the GPS measurement. As such, the processor must determine the appropriate altitude, utilizing a combination of these measurements. In particular, as indicated at step 30, the device is started up and initialized. Processing advances to step 32, at which the processor 18 measures the difference between an elevation reading provided from the barometric altimeter and an elevation reading provided by the GPS unit. Processing advances to step 34, at which the processor 18 computes the average between that difference. As will be understood and appreciated, upon the initial measurement at step 32, the average difference will simply be equal to the difference. As will be further understood, and appreciated, GPS based and barometric altimeter based measurements are taken continuously, or periodically, and on additional passes through this processing loop, the additional information at step 34 is averaged recursively, although other averaging techniques may be employed.

As processing advances to step 36, processor 18 computes the uncertainty of the average difference determined at step 34. A decision statistic is employed to make the decision to use the estimated barometer altimeter difference to calibrate the baro-altimeter reading.

At step 38, the processor 18 determines an average barometer drift for an elapsed time associated with the computed average difference determined at step 34. In particular, memory 20 preferably has, in table form, the average drift of the barometer over time. Following step 38, the processing advances to step 40. At step 40, processor 18 determines whether the uncertainty of the computed average difference, $\sigma_{\Delta H_{ave}}(k)$, as determined at step 36, is significantly less than the uncertainty due to baro drift, $\sigma_{Baro}$, as obtained at step 38. In particular, it is determined whether the uncertainty of the computed average difference is less than the determined average barometer drift by a selected threshold. When the uncertainty of the computed average difference $\sigma_{\Delta H_{ave}}(k)$ is not less than $\sigma_{Baro}$ by at least the threshold amount, processing returns to step 32, so that the processor may continue taking difference measurements. When, however, it is determined at step 40 that the uncertainty of the computed average difference is less than a preselected threshold than the obtained average barometer drift, processing advances to step 42.

At step 42, processor 18 determines whether the elapsed time, that being the time associated with the measurements taken thus far, is greater than a scaled correlation time of GPS vertical errors. When it is determined at step 42 that the elapsed time is not greater than a scaled correlation time of GPS vertical errors, processing returns to step 32. When, however, it is determined that the elapsed time is greater than a scaled correlation time of GPS vertical errors, processing advances to step 44. At step 44, the processor 18 calibrates the barometric altimeter, pursuant to the processing flow of FIG. 5 as discussed below. Following the calibration at step 44, processing advances to step 46, where the error statistics of the average difference are reinitiated based upon calibrated barometric altimeter and processing then returns to step 32.

With reference particularly to FIG. 5, calibration of the barometric altimeter is illustrated and described. At step 48 of FIG. 5, the device 10 of the present invention computes a preliminary calibrated barometrically determined elevation.

The calibration process begins with obtaining a calibrated barometric altitude $H_{B,cal}$ by subtracting the estimated calibration altitude difference from the current barometric altitude i.e. $H_{B,cal}(t)=H_B(t)-\Delta H_{cal}$ to remove the bias and thus approximate the true altitude $H_T(t)$. This is the approach taken in prior art which is not an optimal approach. The present invention goes further than prior art, by using the calibrated barometric altitude $H_{B,cal}$ to compute a base calibration pressure $P_{B,cal}$, which is then used to compute local altitude $H_B$.

Processing then advances to step 50, where the processor 18 computes a calibrated base pressure value $P_B$. The calibrated base pressure $P_B$ is determined by solving the following equation for $P_B$, identified as $P_{B,cal}$.

$$P_{B,cal} = \frac{P_L}{\left[\frac{H_{B,cal} * L}{T_O} + 1\right]^{\frac{-g}{RL}}}$$

At step 52, processor 18 computes a calibrated barometric elevation for use in subsequent measurements. In particular, a calibrated barometric elevation, utilizing the computed calibrated base pressure value, $P_{B,cal}$, is determined according to the following equation:

$$H_{B,cal} = \frac{T_O}{L}\left[\left(\frac{P_L}{P_{B,cal}}\right)^{\frac{-RL}{g}} - 1\right]$$

The calibrated barometric elevation is then displayed on display 14 of device 10, and used in further processing.

Accordingly, the present invention employs a method of estimating the barometric bias using the difference term $\Delta H_{ave}$ to common mode out any dynamical changes due to movement of the baro-altimeter and the GPS in tandem which is unique with respect to known methods. In other words, the method of the present invention accounts for the fact that changes in altitude by a user are reflected in both the barometric altitude reading and the GPS altitude reading, thereby allowing calibration to take place while the baro-altimeter and GPS are in motion. A user is not constrained to be motionless during the "calibration mode". Furthermore, this method allows the barometric error to be continuously estimated and used to calibrate the system when such a need is determined by the previously discussed calibration decision model.

The best known mode for carrying out the present invention utilizes models as described below.

Barometric Model

The barometric altitude is modeled by $$H_B(t)=H_T(t)+B_B(t)+Q_B(t) \tag{1}$$

where $H_B(t)$ is the barometric pressure indicated altitude, $H_T(t)$ is the true altitude in MSL, $B_B(t)$ is a slowly varying bias-like term, and $Q_B(t)$ is a zero mean Gaussian noise term of variance $\sigma_Q^2$. Equation (1) shows that indicated barometric altitude is the sum of the true altitude, plus a bias-like term that is due to the pressure variation of local pressure from the standard atmospheric model, and a noise term that is due to noise of the sensor, A/D, quantization, and other sources.

In order to calibrate the barometric altimeter, the bias term $B_B(t)$ must be determined.

GPS Model

GPS altitude is modeled by $$H_G(t)=H_T(t)+B_G(t)+C_G(t) \tag{2}$$

where $H_G(t)$ is the GPS altitude (in MSL), $B_G(t)$ is a slowly varying bias term due to ionospheric errors, ephemeris errors, satellite clock errors, and other factors, and $C_G(t)$ is a zero mean correlated noise term of a much shorter time constant than either $B_G(t)$ or $B_B(t)$. The variance of the $C_G(t)$ process is $\sigma_{V,GPS}^2$ and is an estimate of the errors associated with the vertical channel. When Selective Availability was in operation, $C_G(t)$ was the largest contributor to GPS altitude error (by far). Also, the $B_G(t)$ term is typically much smaller magnitude than the $B_B(t)$ term.

Determining Error in Barometric Altitude

One approach to calibrating the baro-altimeter using GPS is to simply perform a difference of equations (1) and (2) at a particular point in time where certain statistical rules (to be discussed later) are met.

$$H_B(t)-H_G(t)=\Delta H(t)=B_B(t)+Q_B(t)-B_G(t)-C_G(t) \quad (3)$$

Taking the expected value of $\Delta H(t)$ yields $$\Delta H(t)=B_B(t)-B_G(t) \quad (4)$$

since the expected value of terms $Q_B(t)$ and $C_G(t)$ is zero (they are zero mean noise processes).

One can then calibrate the baro-altimeter using $\Delta H(t)$. Calibration is discussed in more detail later.

Because $Q_B(s)$ and $C_G(t)$ are zero mean random processes, one can reduce the error involved estimating $B_B(t)$ by averaging $\Delta H(t)$ over many samples. Note that $B_G(t)$ is ignored since it is typically small. When estimating a random bias in the presence of additive noise, the variance of the estimate is reduced by the number of samples used to form the estimate only if the additive noise is uncorrelated. $Q_B(t)$ is indeed uncorrelated Gaussian noise. However $C_G(t)$ is correlated noise with a correlation time of $\tau_C$. Therefore the estimation error is treated differently.

One can recursively average $\Delta H(t)$ over many samples according to eqn. (5).

$$\Delta H_{ave}(k) = \frac{k-1}{k}\Delta H_{ave}(k-1) + \frac{1}{k}\Delta H(t_n) \quad (5)$$

The uncertainty of this average estimate is the root sum square of uncertainty reduction in $\sigma_Q$ and the uncertainty reduction to a $\sigma_{V,GPS}$ eqn. (6).

$$\sigma_{\Delta H_{ave}}(k) = \left(\frac{\sigma_Q^2}{k} + \frac{\sigma_{V,GPS}^2}{1+\frac{k*\Delta t}{\tau_C}}\right)^{1/2} \quad (6)$$

where k is the number of samples in the average, and $\Delta t$ is the interval between samples.

Note that the contribution of $\sigma_{V,GPS}$ is reduced according to the correlation time of this process. What this means is that essentially one correlation time must elapse before samples of the $C_G(t)$ process are sufficiently decorrelated to contribute an uncertainty reduction equivalent to an independent sample.

It is noted that $\sigma_{V,GPS}$ is a dynamically changing function, whereas $\sigma_Q$ is a quantity that is chosen a-priori. To accommodate these dynamics, $\sigma_{V,GPS}$ is also recursively computed over the estimation interval. Again, the same weighting function as used in eqn. (5) is used here $$\sigma_{V,ave}(k) = \frac{k-1}{k}\sigma_{V,ave}(k-1) + \frac{1}{k}\sigma_{V,GPS}(t_n) \quad (7)$$

Then $\sigma_{V,ave}(k)$ is substituted into equation (6).

$$\sigma_{\Delta H_{ave}}(k) = \left(\frac{\sigma_Q^2}{k} + \frac{\sigma_{V,ave}^2(k)}{1+\frac{k*\Delta t}{\tau_C}}\right)^{1/2} \quad (8)$$

Equation (8) is the final form of the uncertainty estimate for $\Delta H_{ave}$.

Decision Statistics For Calibrating Baro-Altimeter

The primary decision statistic to use the baro-altimeter difference estimate $\Delta H_{ave}(k)$ to calibrate the baro-altimeter is when $$\sigma_{\Delta H_{ave}}(k) < \beta * \rho_{Baro}(t_n-t_{cal}) \quad (9)$$

where $\beta$ is any non-negative constant and $\sigma_{Baro}(t_n-t_{cal})$ is an estimate of the uncertainty to the baro-altimeter. $\sigma_{Baro}$ is a function of the time that has elapsed since the last calibration and the uncertainty of the calibration. Furthermore, k is constrained so that $$k*\Delta t > \alpha * \tau_C \quad (10)$$

which constrains the averaging period to be some multiple $\alpha$ of the correlation time of $C_G(t)$.

Also, $B_B(t)$ does vary slowly with time. If the averaging period exceeds another time threshold, $t_{max}$, the assumption that $B_B(t)$ is constant does not hold, and the averaging process is re-initialized.

Once the calibration decision statistics have been met, $\Delta H_{ave}(k)$ is set equal to $\Delta H_{cal}$, and all recursive estimation algorithms are re-initialized, in particular $\sigma_{Baro}$ is set equal to $\sigma_{\Delta H,ave}$.

Approach to Calibrating Barometric Altimeter

The simplest approach to calibration of the baro-altimeter is to simply subtract $\Delta H_{cal}$ from the current barometric altitude $$H_{B,cal}(t)=H_B(t)-\Delta H_{cal} \quad (11)$$

This removes the bias $B_B(t)$ and thus $H_{B,cal}(t)$ approximates $H_T(t)$, the true altitude.

Indeed, this is the approach taken in McBurney, et al. However, this is not the optimal approach. A fundamentally different approach to baro calibration is used in this invention.

Standard Atmosphere Model Relating Pressure to Altitude

For altitude below 11,000 meters, the following equation is used to compute altitude from pressure.

$$H_B = \frac{T_O}{L}\left[\left(\frac{P_L}{P_B}\right)^{\frac{-RL}{g}} - 1\right] \quad (12)$$

where the following quantities are define in the 1993 ICAO Standard Atmosphere Model.

$T_O$=Standard Temperature at Sea Level
L=Lapse rate
R=Gas Constant
g=Acceleration of Gravity
$P_L$=Local Pressure (measured by barometer)

$P_B$=Base pressure (in this case pressure at Sea Level)
$H_B$=Local pressure altitude From eqn. (12), it is shown that the model that relates pressure to altitude is an exponential model, not a linear model. Thus, if one determines that $\Delta H_{cal}$ is 30 meters at a nominal altitude of 500 meters, it does not hold that the proper calibration factor will still be 30 meters at a nominal altitude of 5000 meters. The reason is that 30 meters of elevation difference at 500 meters nominal altitude is a far greater pressure differential than 30 meters of elevation difference at 5000 meters nominal altitude. The calibration method employed in the invention accounts for this discrepancy.

Barometric Altimeter Calibration Technique

In this invention during calibration $P_L$ is treated as a constant and $P_B$ is allowed to vary. The newly computed $P_{B,cal}$ (see eqn. 13) is used in subsequent altitude computations in equation (12).

$P_{B,cal}$ is computed as shown in equation (13). $H_{B,cal}$ is the calibrated barometric altitude estimated using GPS.

$$P_{B,cal} = \frac{P_L}{\left[\frac{H_{B,cal} * L}{T_O} + 1\right]^{\frac{-g}{RL}}} \quad (13)$$

Summary of Barometric Altimeter Calibration Process

1. Evaluate equations (9) and (10) to determine if calibration decision statistics are met.
2. If so, compute $H_{B,cal}$ according to eqn. (13).
3. Compute $P_{B,cal}$ according to eqn. (13).
4. Begin computing $H_B$ according to (12) using $P_{B,cal}$.
5. Set $\sigma_{Baro}$ to $\sigma_{\Delta H,ave}$.
6. Resume estimation of $\Delta H_{ave}$ and $\sigma_{V,ave}(k)$ using eqns. (5–7).

From the foregoing it will be seen that this invention is one well adapted to attain all ends and objects herein above set forth together with the other advantages which are obvious and which are inherent to the structure.

It will be understood that certain features and sub-combinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A device comprising:
   an altimeter comprising a barometric pressure sensor; and
   a GPS unit, wherein said device (a) computes a preliminary calibrated elevation for said altimeter based upon a barometric based elevation reading and a difference between said barometric based elevation reading and a GPS based elevation reading, (b) computes a base pressure value corresponding to said preliminary calibrated elevation and (c) computes a fully-calibrated elevation.

2. The device as set forth in claim 1, further having a display wherein said device displays said fully calibrated elevation on said display.

3. The device as set forth in claim 1, wherein, when said device takes an additional GPS based and barometric based elevation reading, said device uses said fully-calibrated elevation in computing a difference between said additional readings.

4. An electronic device comprising:
   an altimeter comprising a barometric pressure sensor;
   a GPS unit; and
   a housing for housing said altimeter and said GPS unit, wherein said device is operable to calibrate said altimeter when said device is in motion based upon a difference between a first elevation reading produced by said altimeter and a second elevation reading produced by said GPS unit.

5. An electronic device comprising:
   an altimeter comprising a barometric pressure sensor;
   a GPS unit; and
   a housing for housing said altimeter and said GPS unit, wherein said device is operable to calibrate said altimeter when said device is in motion based upon a difference between a first elevation reading produced by said altimeter and a second elevation reading produced by said GPS unit, such that the device is operable to compute a base pressure that corresponds to said difference.

6. The device as set forth in claim 1, wherein the altimeter may be continuously calibrated.

* * * * *